United States Patent [19]

Kayihan

[11] Patent Number: 5,094,892

[45] Date of Patent: Mar. 10, 1992

[54] METHOD OF PERFUSING A POROUS WORKPIECE WITH A CHEMICAL COMPOSITION USING COSOLVENTS

[75] Inventor: Ferhan Kayihan, Tacoma, Wash.

[73] Assignee: Weyerhaeuser Company, Tacoma, Wash.

[21] Appl. No.: 659,482

[22] Filed: Feb. 25, 1991

Related U.S. Application Data

[63] Continuation of Ser. No. 270,185, Nov. 14, 1988, abandoned.

[51] Int. Cl.⁵ .............................................. B05D 1/18
[52] U.S. Cl. .................................... 427/440; 427/430.1
[58] Field of Search ............................. 427/430.1, 440

[56] References Cited

U.S. PATENT DOCUMENTS

| | | | |
|---|---|---|---|
| 4,582,731 | 4/1986 | Smith | 427/421 |
| 4,734,451 | 3/1988 | Smith | 118/300 X |
| 4,923,720 | 5/1990 | Lee et al. | 427/422 |

Primary Examiner—Shrive Beck
Assistant Examiner—Alain Bashore

[57] ABSTRACT

The invention is a method of perfusing a material, such as wood, with a chemical composition that is insoluble in a given first fluid under supercritical conditions. A cosolvent is mixed with the first solvent to provide adequate solubility at supercritical conditions for the chemical composition. The method is useful for uniformly impregnating otherwise difficulty permeable materials. Impregnation of lumber or structural timbers with a preservative would be a typical use of the method.

6 Claims, 1 Drawing Sheet

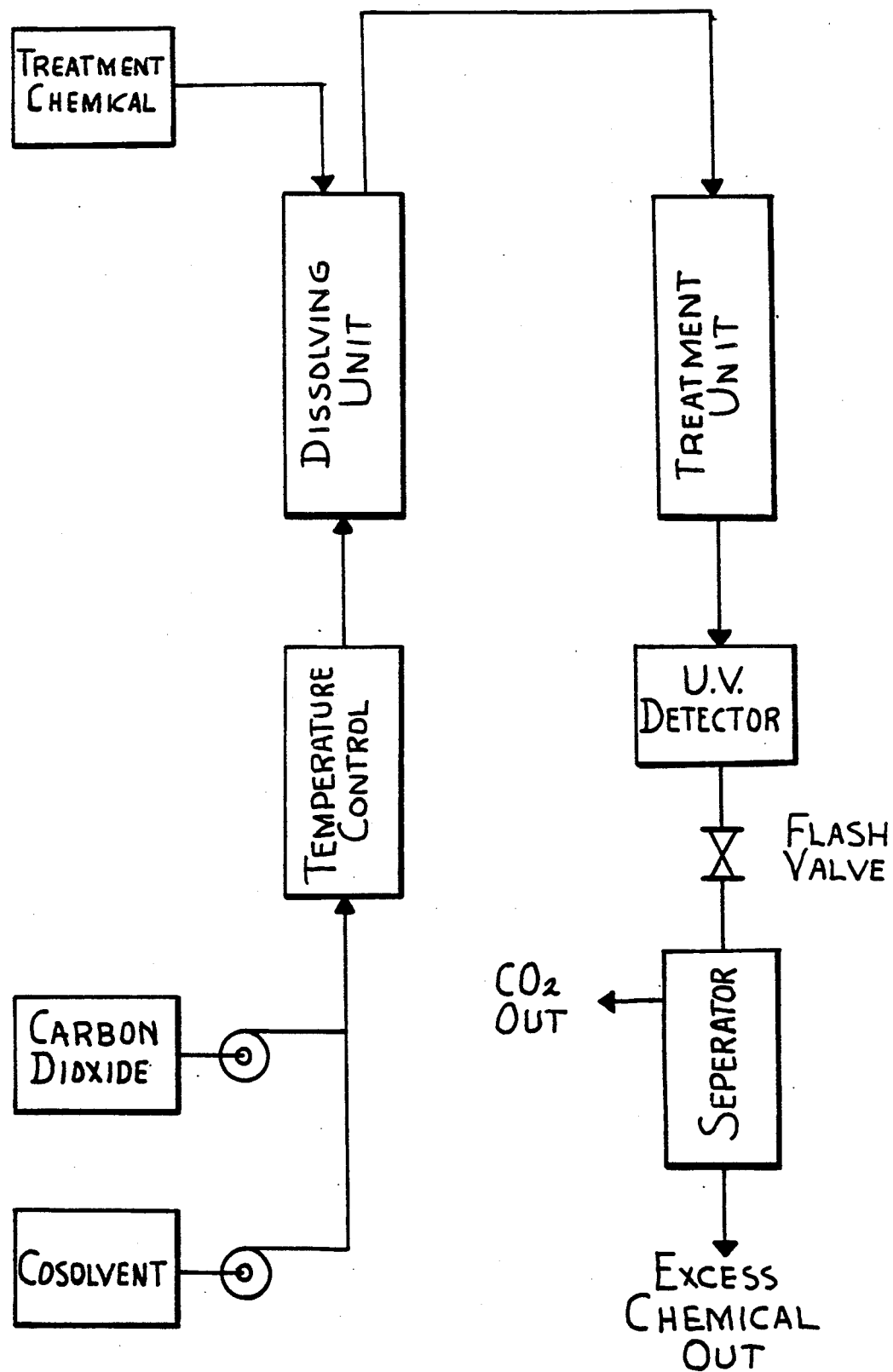

METHOD OF PERFUSING A POROUS WORKPIECE WITH A CHEMICAL COMPOSITION USING COSOLVENTS

This application is a continuation of application Ser. No. 07/270,185, filed Nov. 14, 1988, now abandoned.

BACKGROUND OF THE INVENTION

The present invention is a method of enhancing the perfusion of a porous workpiece with a chemical composition using two or more given fluid solvents under supercritical conditions. The method is particularly well adapted for impregnation and deposition into wood of preservative and other materials which have poor solubility in supercritical carbon dioxide.

The critical temperature of a fluid is the temperature above which liquefaction is not possible at any pressure. Critical pressure is defined as the pressure required to liquefy a gas at the critical temperature. At critical conditions there is no distinction between the liquid and gaseous states. At temperatures and pressures above those at the critical point, fluids are said to be under supercritical conditions. While not truly liquids, they maintain many of the properties of a liquid. However, there are also significant differences. The solvent power of supercritical fluids for various materials is increased significantly above the critical point. When a chemical material is dissolved in a supercritical fluid, the resulting solution appears to have most or all of the characteristics of a true solution. However, the viscosities of these supercritical solutions are very much lower than viscosities of conventional solutions.

The high solvent power of supercritical fluids has found wide commercial application. Among other applications, the technique is used for the extraction of various flavor resins and alkaloids from natural materials. As on example, U.S. Pat. No. 3,806,619 to Zosel discloses the use of supercritical carbon dioxide for extraction of caffeine from coffee. In similar fashion, U.S. Pat. No. 4,104,409 to Vitzhum describes the removal of certain flavoring resins from hops. Among other uses, U.S. Pat. No. 4,354,922 to Derbyshire et al shows the use of a supercritical fluid to extract heavy hydrocarbon oil constituents. The temperature may then be changed or the pressure reduced to precipitate the dissolved hydrocarbon constituents.

Supercritical solutions have also been used for the deposition of various materials onto or into a substrate. Vitzhum, et al, U.S. Pat. No. 4,167,859 teaches extraction of certain aromatic constituents of tea using supercritical carbon dioxide. These constituents are set aside while the tea is moistened and subsequently again extracted with wet supercritical carbon dioxide to remove caffeine. After caffeine removal, the aromatic constituents are then redeposited in the tea from solution in supercritical carbon dioxide.

Berneburg et al, in U.S. Pat. No. 4,552,786, teach the use of supercritical fluids to carry ceramic percursor materials into the pores of a ceramic host in order to fill void spaces and approach the ultimate density of the ceramic material. This is an example which takes advantage of the very low viscosity of supercritical solutions to penetrate what would otherwise be very poorly permeable materials.

West German Offenlegungsschrift 28 53 066 describes the use of supercritical solutions to coat the surface of porous powders or porous articles, such as active nickel catalysts, with an inert protective material. Conditions are regulated so that coatings only a few molecules thick can be applied to the material. In addition to the protection of the active catalysts, the inventors disclose that other porous materials, such as fabrics, can be coated or impregnated with protective or decorative layers. The inventor further notes that by proper selection of extraction and extraction pressure and temperature, the components to be dissolved by the supercritical fluid can be dissolved selectively. Unfortunately, the inventors offer no examples or other data which is specifically informative as to how their process is carried out.

Japanese Kokai SHO 59[1984]-101311 discloses a preservative treatment for wood. This uses either carbon dioxide in the supercritical range or liquid carbon dioxide near the supercritical range as a solvent for the preservative. The inventors claim the advantages of faster permeation of the preservative into the wood, elimination of the need of predrying treatment or incising and, above all, the elimination of the need for waste treatment of residual preservative chemical solutions. The one example in the patent shows the use of a water soluble phenol-group inorganic fluoride wood preservative agent in liquid carbon dioxide to treat beech wood. The composition of the treating material is not further described nor is it made clear whether or not any water was present. In this particular case, the carbon dioxide was approximately 11° C. below the critical temperature at which point it would be a true liquid. Under these conditions the inventors found that the preservative agent had permeated to the center of a cube of wood 10 cm on each side. This would not be surprising even under conventional treating conditions due to the short specimen length and large exposed area of end grain. Liquids are well known to permeate end grain at a rate 10–20 times faster than the rate across the grain. However, if the treatment would work as described for larger specimens, it could potentially be very useful.

Most species of wood are very difficult to impregnate deeply with chemical materials such as preservatives and monomers and polymers. The case of Douglas-fir heartwood can be mentioned here. It has been impossible using normal methods to achieve more than a relatively shallow surface impregnation with usual preservative chemicals. In many cases, after environmental exposure of a treated timber, a thin intact surface shell will remain whereas the center portion has been entirely destroyed by decay organisms or wood boring insects. The same is true for other species of wood which show similar low permeability under the normal vacuum-pressure treatment.

The art does not deal in any helpful detail with the problems encountered when it is desired to impregnate a workpiece with a chemical material not adequately soluble in a single supercritical solvent.

SUMMARY OF THE INVENTION

The present invention is a method of perfusing a porous workpiece, such as wood, with a chemical composition that is generally insoluble in a first fluid under conditions near or above the critical point. The method comprises providing a cosolvent in which the chemical composition has at least limited solubility when the mixture of first fluid and cosolvent is raised to supercritical conditions. The cosolvent may be either a pure chemical compound or a mixture of chemical compounds. The chemical composition is then dissolved by contacting it with a mixture of the first fluid and a sufficient amount of the cosolvent. This contact must occur under conditions near or above the critical point for a sufficient time to solubilize at least a portion of the chemical composition. This forms a supercritical solution of the chemical composition.

The process then involves contacting and impregnating the porous substrate with the supercritical solution so as to introduce the chemical material into the workpiece. The workpiece is then removed from the supercritical solution; e.g., by reducing the pressure to atmospheric, so as to leave some portion of the chemical material deposited within the porous substrate of the workpiece.

In its most preferred mode, the process is carried out under true supercritical conditions; i.e., at a temperature and pressure above those at the critical point of the first fluid. However, under some circumstances the method will operate in a wholly satisfactory manner near to but somewhat below critical conditions. The term "near to but somewhat below" is bounded as hereinafter described.

Reduced pressure $P_r$ is defined as $P/P_c$, where P is the actual pressure of the system and $P_c$ is the critical pressure. Reduced temperature $T_r$ is similarly defined as $T/T_c$ where T is the actual operating temperature and $T_c$ is the critical temperature. The invention should be considered to be in an operable range when $T_r$ and $P_r$ are each greater than 0.85. As used herein, the term "supercritical" should be construed sufficiently broadly to encompass the above-defined ranges.

The first solvent will normally be gaseous under ambient conditions although it may also be a liquid. Carbon dioxide is a preferred material for use as the first solvent. The cosolvent may be any which when combined with the first solvent, and the mixture is raised to supercritical conditions, will dissolve at least 0.01 mg of the chemical composition per gram of mixed solvent. Preferably the mixture will dissolve at least 0.1 mg and more preferably at least 1 mg of the chemical composition per gram of mixed solvent. While the chemical composition will frequently have the above or greater solubility in the cosolvent alone, this is not required or necessary. The criterion for solubility is determined when the mixed solvent system is at supercritical conditions.

It is permissible to first dissolve the chemical composition in the cosolvent, if it has adequate solubility and then add the first fluid before or after the system is raised to supercritical conditions. Alternatively, the first fluid and cosolvent may be mixed prior to dissolving the chemical composition.

Depending on the particular chemical composition being impregnated the cosolvent may be either aqueous or nonaqueous, and polar or nonpolar. It is assumed that the cosolvent will be miscible with the first fluid at least to the extent that a sufficient amount of the chemical composition can be dissolved in the mixture when at supercritical conditions.

Wood is a preferred example of a porous material that can be impregnated with a chemical composition. Chemical materials such as dyes, preservatives, those that give dimensional stability, etc., are among the many useful materials which can be impregnated within the wood.

A number of chemical materials are suitable for use as the primary supercritical fluid. As noted, carbon dioxide is preferred but others such as propane, nitrous oxide, saturated and unsaturated halogenated hydrocarbons containing up to about 3 carbon atoms, and mixtures of these materials are suitable. This list of fluids should be considered as exemplary and not limiting.

It is an object of the present invention to provide a method of perfusing a porous workpiece with a chemical composition essentially insoluble in a pure supercritical fluid.

It is a further object to deeply and uniformly perfuse a porous workpiece with a chemical composition.

It is yet another object to uniformly perfuse wood with preservative materials and other chemicals of choice.

These and many other objects will become readily apparent to those skilled in the art upon reading the following detailed description taken in conjunction with the drawing.

BRIEF DESCRIPTION OF THE DRAWING

The single FIGURE is a generalized block diagram showing a suitable process and equipment for treatment of a porous workpiece with a chemical material under supercritical conditions.

DESCRIPTION OF THE PREFERRED EMBODIMENTS

The equipment used for chemical treatment of various substrate materials under supercritical conditions has been generally described in the references discussed earlier. The FIGURE shows an adaptation of this equipment for use with the present invention. While it is configured for use with laboratory scale equipment, it could readily and easily be modified for a commercial operation. The equipment shown is designed to carry out two separate unit operations. The first is solubilization of the treatment chemical using a supercritical fluid solvent and suitable cosolvent. The second step is the treatment and impregnation of the porous workpiece with the dissolved chemical material while the system is still held under supercritical conditions.

For simplicity of description, wood will be used as an example of a porous workpiece. However, it will be understood by those skilled in the art that many other porous materials could be treated and impregnated using the process of the present invention.

The treatment chemical is first charged to a vessel where it is to be dissolved. This will typically be a piece of process equipment, such as a packed tower, which provides a sufficient surface area for contacting the treatment chemical with a supercritical solvent and cosolvent. Alternatively, the treatment chemical may be first dissolved in the cosolvent before it is charged to the extraction unit. A supercritical fluid, such as carbon dioxide or propane, is brought to an appropriate pressure before it is charged to the extraction unit. The cosolvent is similarly brought to operating pressure. The compressed components may first be directed through a heat exchanger to adjust the temperature to the desired operating condition.

In the dissolver at least a portion of the treatment chemical is solubilized in the combined supercritical fluid and cosolvent. The resulting solution is then directed to a treatment chamber where the wood is contained. When used in a commercial process, normally two or more treatment chambers would be employed in parallel so that one could be emptied and recharged while treatment was being carried out in an adjacent unit. The treatment fluid, while still under supercritical conditions, may be recycled from the treatment chamber to the dissolving unit and continuously circulated to maintain an appropriate concentration of treating chemicals.

In the particular configuration shown, an ultraviolet spectrograph is located immediately downstream from the treatment unit. This enables continuous monitoring of the concentration of dissolved material in the supercritical solution. Following this is a pressure reduction valve where the excess fluid with any remaining treatment chemical is flashed to atmospheric pressure. The low pressure fluid may then be directed through a separator where any residual treatment chemical is recovered. The residual first fluid, which usually contains some cosolvent, is either vented to atmosphere or to a recovery system where it can be reused.

Mention was made earlier of the difficulty of deeply impregnating many woods with preservative chemicals, and of the possible progress by Japanese inventors in this regard. Unfortunately, many desirable known or potential chemical impregnants are insoluble in the fluids commonly used for supercritical treatment. As one example, copper naphthenate, a well known preservative material, is virtually totally insoluble in supercritical carbon dioxide. This problem is not limited to preservatives since it is often desirable to deeply impregnate wood with other chemicals for various purposes. One example would be impregnation with known materials that promote dimensional stability. Nor is the problem restricted to wood alone since it general to a great many different porous materials that can be advantageously impregnated with a broad array of chemical materials.

Carbon dioxide has many characteristics which make it an almost ideal fluid for supercritical treatments. It is inexpensive, nontoxic, and is not an environmental pollutant. Unfortunately, as noted above, many desirable chemical impregnants are almost totally insoluble in supercritical carbon dioxide. However, if a suitable cosolvent is used, a sufficient amount of the treatment chemical can be brought into supercritical solution so that an adequate amount can be impregnated into the wood or other porous material.

EXAMPLE 1

As a model porous material, four grams of glass wool was packed into a stainless steel tube 200 mm in length, 9.5 mm outside diameter and about 5 mm inside diameter. This tube was located in the apparatus in the position shown as the "treatment unit" in the drawing. As a model treating chemical a nonionic dye, C.I. Solvent Blue 35 (Color Index 61554), was chosen. This is available in 98% purity from Aldrich Chemical Company, Milwaukee, Wis., as well as from other suppliers. Several grams of the dye in powder form were packed into a tube similar to that just described and retained by using a plug of glass wool in each end of the tube. This was then installed in the apparatus in the position shown in the drawing as the "dissolving unit." The overall equipment was a modified Milton Roy Supercritical Extraction Unit. This equipment is available from LDC Milton Roy, Inc., Riviera Beach, Fla. Carbon dioxide at 10350 kPa and 40° C. was directed through the dissolving unit at a rate of 415 g/hr. The resultant solution from the dissolving unit was then directed through the packed glass fiber column. After a treatment time of 30 minutes, pressure in the system was reduced to atmospheric level. Prior to this time ultraviolet spectroscopy of the supercritical fluid stream indicated a solubility of the solvent blue dye of only 0.021 mg/g (0.0021%) of carbon dioxide. After removal of the glass fiber packed treatment cell, the glass fiber was extracted with acetone to measure the amount of dye transferred. Replicate runs averaged 0.059 mg of Solvent Blue dye per gram of glass fiber (0.0059%).

Another series of runs was made in similar fashion to that just described. However, this time an acetone cosolvent equivalent to 3.95% acetone by weight of carbon dioxide was used in the supercritical mixture. This time the solubility of the dye increased to 0.14 mg per gram (0.014%) of carbon dioxide and cosolvent, over seven times the level originally noted. Similarly, the glass wood retained an average of 0.23 mg of dye per gram of glass (0.023%), about four times as much as was noted in the run with carbon dioxide alone.

EXAMPLE 2

In another run of the apparatus a dowel of yellow birch wood (*Betula allegheniensis*) 4.8 mm in diameter and approximately 20 cm long was used in the treatment unit, instead of the packed glass fiber. In similar fashion to the earlier example, a first run was made using carbon dioxide alone as the supercritical fluid. This was followed by a second run using acetone as a cosolvent in an amount essentially the same as that reported above. Following treatment, the wood dowels were removed and cross sectioned at various locations along their length. The cut sections were then examined at low magnification so that any impregnation of the dye into the wood could be visually observed. In this case where carbon dioxide alone was used as the supercritical fluid, there was little or no visual indication of any transfer of dye into the wood. However, when the cosolvent was employed, the wood appeared to be a uniform blue color throughout its entire cross section. There was no evidence of selective longitudinal transport of the dye from the exposed end portions of the dowels.

It will be understood by those skilled in the art that the foregoing discussion is exemplary in nature. Many variations that have not been described will be apparent to those skilled in the art and the scope of the invention should be considered as limited only by the following claims.

We claim:

1. A method of perfusing wood with a chemical composition generally insoluble in a first fluid under conditions near or above the critical point which comprises:
   providing a cosolvent in which the chemical composition has at least limited solubility, said cosolvent being selected from pure chemical compounds and mixtures of chemical compounds;
   contacting the chemical composition with a mixture of the first fluid and a sufficient amount of the cosolvent while under conditions near or above the critical point for a sufficient time to solubilize at least a portion of the chemical composition and form a supercritical solution;
   placing the wood in a treatment chamber;
   perfusing the wood in the treatment chamber with the solution of the chemical composition while said wood and solution are at conditions near or above the critical point so as to introduce the chemical material into the wood, and removing the wood from the supercritical solution so as to leave a portion of the chemical material impregnated within the wood.

2. The method of claim 1 in which the chemical composition is first dissolved in the cosolvent prior to contacting it with the first fluid.

3. The method of claim 1 in which the first fluid and cosolvent are mixed prior to dissolving the chemical composition.

4. The method of claims 1, 2, or 3 in which the first fluid is carbon dioxide.

5. The method of claims 1, 2, or 3 in which the chemical material is a wood preservative.

6. The method of claims 1, 2, or 3 in which the cosolvent is acetone.

* * * * *